April 15, 1924. 1,490,841
R. Q. MacDONALD ET AL
GREASE GUN
Filed June 30, 1921
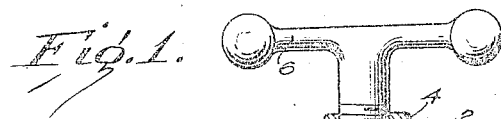
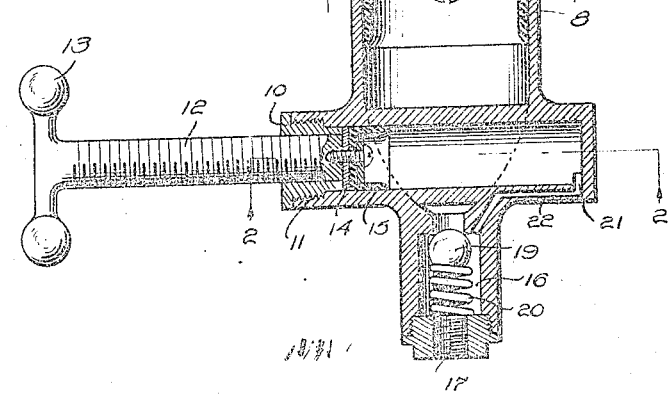
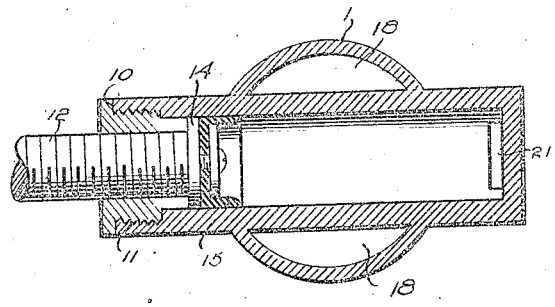
Inventor
R. Q. MacDONALD
WILLIAM R. BOZARTH
By
Ch. Fowler Attorney Patented Apr. 15, 1924.

1,490,841

UNITED STATES PATENT OFFICE.

ROY Q. MacDONALD AND WILLIAM R. BOZARTH, OF TONOPAH, NEVADA.

GREASE GUN.

Application filed June 30, 1921. Serial No. 481,630.

*To all whom it may concern:*

Be it known that we, ROY Q. MACDONALD and WILLIAM R. BOZARTH, citizens of the United States, residing at Tonopah, in the county of Nye and State of Nevada, have invented certain new and useful Improvements in Grease Guns, of which the following is a specification.

This invention relates to grease guns and it comprises a main cylinder and an auxiliary cylinder arranged at right angles thereto, pistons mounted in said cylinders, an outlet chamber, communicating passages between said chamber and the main cylinder, a check valve arranged therein, and a communicating passage between said auxiliary cylinder and said outlet chamber.

In the use of a grease gun it is frequently necessary to force grease into bearings where lubrication previously used has become solidified by the evaporation of its lighter constituents and by becoming mixed with dust and other foreign matter. This is particularly true in lubricating the springs of motor vehicles wherein the space provided for lubrication is small and is continuously exposed to dust and mud. When grease has become hardened it is very difficult and often impossible to force in grease into the bearings with the ordinary type of grease gun which is made of relatively large capacity.

In the present invention we have provided a grease gun having a main chamber of relatively large capacity for filling bearings and housings where low resistance is offered and being further provided with a small bore for use when a great deal of pressure is necessary. The small cylinder is automatically filled in the ordinary use of the large cylinder and is always ready for service when needed. A check valve is provided near the outlet to prevent the grease forced from the small cylinder under high pressure from entering the main cylinder.

In the accompanying drawings we have shown one embodiment of the invention. In this showing, Figure 1 is a central vertical sectional view, Figure 2 is a horizontal sectional view on the line 2—2 of Figure 1, and Figure 3 is a similar view on line 3—3 of Figure 1.

Referring to the drawings, the reference numeral 1 designates a main cylinder having a cap 2 which may be detachably secured thereto as by means of threads 3 to permit refilling. The cap is provided with a boss 4 which is internally threaded for the reception of a threaded rod or stem 5. This threaded stem is provided with a handle 6 and a piston or plunger 7 is mounted on the lower end of the rod. The piston is provided with suitable packing 8 to prevent leakage.

Arranged adjacent the bottom of the main cylinder and substantially at right angles thereto there is provided an auxiliary cylinder 9 having a cap or head 10 secured to the cylinder by means of threads 11. The cap is internally threaded for the reception of a threaded rod 12 which is provided with a handle 13 and carries a piston 14 on its lower end. The piston is provided with suitable packing 15.

An outlet chamber 16 is arranged beneath the auxiliary cylinder, the outlet chamber being provided with an outlet opening 17 of the usual form. The main cylinder communicates with the outlet chamber by means of passages 18 arranged on each side of the auxiliary cylinder (see Figure 2). A check valve 19 is arranged at the bottom of these communicating passages being retained in place by a spring 20. The auxiliary cylinder communicates with the outlet chamber by means of a passage 21 extending through the wall 22 of the auxiliary chamber.

In operation, the gun is filled with grease by removing the cap 2 and is ordinarily used in the usual manner by screwing the rod 5 into the main cylinder to lower the piston 7 and force the grease through the passages 18 to the outlet chamber 16 and thence to the outlet opening 17. In the operation of the piston in the main cylinder sufficient grease will pass upwardly through the passage 21 to fill the auxiliary cylinder. When a bearing or housing is to be lubricated in which grease has become solidified and it is difficult to force new grease into it, the auxiliary cylinder 9 is used which enables the operator to force the lubricant into the bearing at a higher pressure. By operating the handle 13 the piston 14 is moved inwardly forcing e lubricant through the passage 22 to the outlet chamber 16.

Although we have shown and described the preferred embodiment of our invention, it is to be understood that various changes in the shape, size, and arrangement of parts may be resorted to without departing from the spirit of the invention or the scope of the subjoined claims.

Having thus described our invention, we claim:

1. A grease gun comprising a main cylinder, an auxiliary cylinder arranged at an angle thereto, an outlet chamber below said main cylinder independently operable pistons arranged in said cylinders and separate communicating passages between each of said cylinders and said outlet chamber.

2. A grease gun comprising a main cylinder, an auxiliary cylinder arranged at an angle thereto, independently operable pistons arranged in said cylinders, an outlet chamber below said main cylinder, said cylinders being provided with separate passages communicating with said outlet chamber, and means for preventing communication between said outlet chamber and said main cylinder.

3. A grease gun comprising a main cylinder, an integral auxiliary cylinder arranged transversely centrally and adjacent one end of said main cylinder, the external diameter of said auxiliary cylinder being smaller than the internal diameter of said main cylinder, independently operable pistons arranged in said cylinders, an outlet chamber arranged below said main cylinder, and communicating therewith around said auxiliary cylinder, a check valve arranged in said outlet chamber to prevent flow of grease from said outlet chamber to said main cylinder, and means to permit communication between said auxiliary cylinder and said outlet chamber.

4. A grease gun comprising a main cylinder, an auxiliary cylinder of smaller diameter arranged transversely thereof adjacent one end, said main cylinder being provided with passages extending on each side of said auxiliary cylinder and communicating with each other below said auxiliary cylinder, an outlet chamber arranged adjacent the meeting ends of said passages, a check valve arranged in said chamber to prevent flow of material from said outlet chamber to said main cylinder, means for permitting communication between said auxiliary cylinder and said outlet chamber, and means for forcing material from said cylinders to said outlet chamber.

5. A grease gun comprising a pair of cylinders of different diameters, an outlet chamber communicating through separate passages with each of said cylinders, and independently operable pistons arranged in said cylinders.

In testimony whereof we affix our signatures in presence of two witnesses.

ROY Q. MacDONALD.
WILLIAM R. BOZARTH.

Witnesses:
H. H. ATKINSON,
LOWELL DANIELS.